July 5, 1927.
B. P. JOYCE
HOIST
Filed Sept. 6, 1923
1,635,162
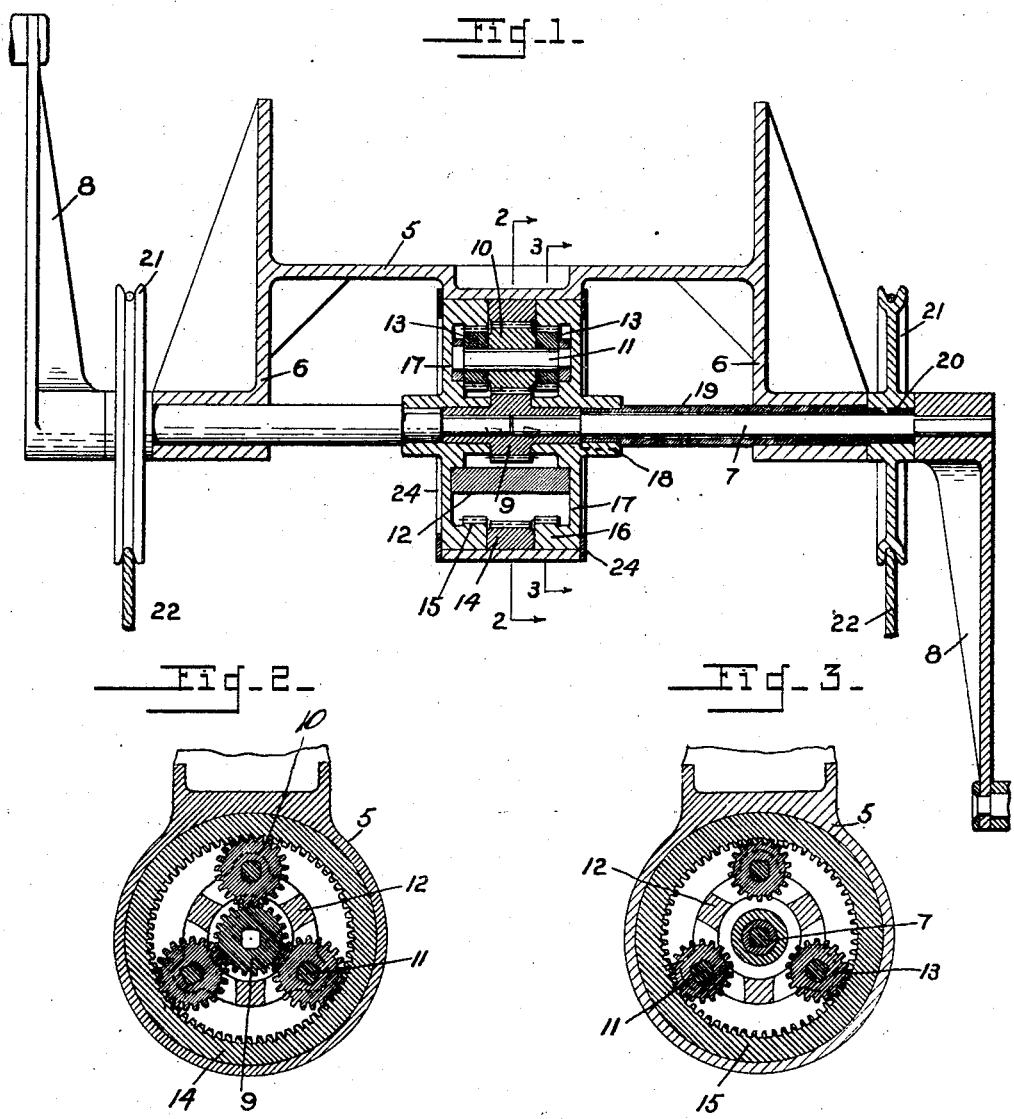

Patented July 5, 1927.

1,635,162

UNITED STATES PATENT OFFICE.

BRYAN P. JOYCE, OF DAVENPORT, IOWA, ASSIGNOR TO THOMAS A. CONLON, OF SILVER SPRING, MARYLAND.

HOIST.

Application filed September 6, 1923. Serial No. 661,273.

(GRANTED UNDER THE ACT OF MARCH 3, 1883; 22 STAT. L. 625.)

The invention described herein may be used by the Government, or any of its officers or employees in prosecution of work for the Government, or by any other person in the United States, without payment to me of any royalty thereon, in accordance with the act of March 3, 1883.

The present invention relates to hoists and particularly to that type of hoist employed in elevating the trails of gun carriages so as to aline the trail with the slides on a transport wagon whereby the cradle and the gun mounted thereon may be slid from the gun carriage to the transport wagon for transport.

With the foregoing and other objects in view, my invention resides in the novel arrangement and combination of parts and in the details of construction hereinafter described and claimed, it being understood that changes in the precise embodiment of the invention herein disclosed may be made within the scope of what is claimed without departing from the sprit of the invention.

A practical embodiment of the invention is illustrated in the accompanying drawing in which Fig. 1 is a sectional view showing my hoist mounted in place;

Fig. 2 is a section on the line 2—2 of Fig. 1; and

Fig. 3 is a section on the line 3—3 of Fig. 1.

Referring to the drawings by numerals of reference:

I have shown at 5 a bracket or support which may be attached to the transport wagon and which carries my hoist. The supporting bracket is provided with depending arms 6 in which are journaled shafts 7 actuated by cranks 8 for operating the hoist. The shafts 7 at their inner ends are keyed to a pinion 9 which meshes with three similar gears 10. The gears 10 are squared on shafts 11 carried by a cage 12. Squared on the shafts 11 and at either side of each of the gears 10 are pairs of gears 13. The gears 10 mesh with an annular gear 14 fixed to the bracket 5. The gears 13 mesh with annular gears 15 which are formed on the annular flanges 16 of disks 17. These disks 17 are keyed as at 18 to sleeves 19 arranged concentrically with the shafts 7 and journaled in the arms 6 of the bracket 5. The sleeves 19 are provided with reduced outer ends 20 on which are fixedly mounted sheaves 21. To these sheaves 21 are attached the ropes or chains 22 for hoisting the gun trails. The disks 17 are mounted so as to freely revolve in the bracket 5 and are fixed to the sheaves or shafts 19. Plates 24 fixed to the bracket 5 are provided for retaining the disks in place.

In use one end of the ropes or chains 22 is attached to the trail members and the gun elevated by movement of the cranks 8. By varying the annular gears 14 and 15 and by changing the other gears and pinion accordingly any desired reduction or change in direction of motion may be obtained.

I claim:

1. A hoisting device embodying a bracket, an annular gear secured to the bracket, rotary members formed with annular gears housed in the bracket and positioned on each side of the annular gear, sheaves supported by the bracket and connected to the rotary members, shafts passing through the sheaves and the rotary members, means for rotating the shafts and a gear train interposed between the shafts, the annular gear and the rotary members for transmitting rotation of the shafts to the rotary members and sheaves.

2. A hoisting device embodying a stationary bracket, an annular gear fixed to the bracket, rotary members formed with annular gears positioned on each side of the annular gear, shafts passing through the rotary members, means for rotating the shafts, and a gear train connecting the shafts with the annular gear and rotary members.

BRYAN P. JOYCE.